(12) United States Patent
Sontag et al.

(10) Patent No.: US 8,700,544 B2
(45) Date of Patent: Apr. 15, 2014

(54) FUNCTIONALITY FOR PERSONALIZING SEARCH RESULTS

(75) Inventors: David A. Sontag, Cambridge, MA (US); Kevyn B. Collins-Thompson, Seattle, WA (US); Paul N. Bennett, Kirkland, WA (US); Ryen W. White, Woodinville, WA (US); Susan T. Dumais, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 13/162,906

(22) Filed: Jun. 17, 2011

(65) Prior Publication Data

US 2012/0323828 A1    Dec. 20, 2012

(51) Int. Cl.
*G06N 5/00* (2006.01)
*G06F 1/00* (2006.01)

(52) U.S. Cl.
USPC .............................. 706/12; 707/769; 709/206

(58) Field of Classification Search
USPC .......................................................... 706/12
See application file for complete search history.

(56) References Cited

U.S. PATENT DOCUMENTS

| 7,231,393 | B1 | 6/2007 | Harik et al. |
| 7,809,740 | B2 | 10/2010 | Chung et al. |
| 2006/0074883 | A1 | 4/2006 | Teevan et al. |
| 2010/0153315 | A1 | 6/2010 | Gao et al. |
| 2010/0228715 | A1 | 9/2010 | Lawrence |
| 2011/0040752 | A1 | 2/2011 | Svore et al. |
| 2011/0289068 | A1 | 11/2011 | Teevan et al. |
| 2012/0089621 | A1* | 4/2012 | Liu et al. ........................ 707/749 |
| 2012/0158685 | A1 | 6/2012 | White et al. |
| 2012/0290605 | A1* | 11/2012 | Ickman et al. ................. 707/769 |

OTHER PUBLICATIONS

Radlinski, et al., U.S. Appl. No. 13/158,483, "Using Aggregate Location Metadata to Provide a Personalized Service," filed Jun. 13, 2011, 56 pages.

De La Chica, et al., U.S. Appl. No. 13/225,583, "Using Reading Levels in Responding to Requests," filed Sep. 6, 2011, 35 pages.

Elbassuoni, et al., "Adaptive Personalization of Web Search," retrieved at <<http://citeseerx.ist.psu.edu/viewdoc/download-?doi=10.1.1.93.9349&rep=rep1&type=pdf#page=5>>, SIGIR 2007 Workshop on Web Information Seeking and Interaction, 2007, 4 pages.

(Continued)

*Primary Examiner* — Alan Chen
*Assistant Examiner* — Kalpana Bharadwaj
(74) *Attorney, Agent, or Firm* — Dave Ream; Jim Ross; Micky Minhas

(57) ABSTRACT

A query processing system is described herein for personalizing results for a particular user. The query processing system operates by receiving a query from a particular user u who intends to find results that satisfy the query with respect to a topic $T_u$, the user being characterized by user information $\theta_u$. In one implementation, the query processing system then produces a generic topic distribution $Pr_r(T|q)$ associated with the query that is germane to a population of generic users, as well as a user-specific query-dependent topic distribution $Pr(T_u|q,\theta_u)$ for the particular user. The query processing system then produces personalized results for the particular user based on $Pr_r(T|q)$ and $Pr(T_u|q,\theta_u)$. The query processing system can use multiple techniques to produce $Pr(T_u|q,\theta_u)$, such as, in one approach, a discriminative learning approach.

20 Claims, 10 Drawing Sheets

(56) References Cited

OTHER PUBLICATIONS

Lin, et al., "Using Probabilistic Latent Semantic Analysis for Personalized Web Search," retrieved at <<http://citeseerx.ist.psu.edu/viewdoc/download?doi=10.1.1.84.6198&rep=rep1&type=pdf>>, APWeb 2005, LNCS 3399, Springer-Verlag Berlin Heidelberg, 2005, pp. 707-717.

De Gemmis, "Preference Learning in Recommender Systems," retrieved at <<http://www.ke.tu-darmstadt.de/events/PL-09/06-deGemmis.pdf>>, Proceedings of the ECML/PKDD, 2009, 15 pages.

Ke, et al., "Web Dynamics and their Ramifications for the Development of Web Search Engines" retrieved at <<http://citeseerx.ist.psu.edu/viewdoc/download?doi=10.1.1.134.8475&rep=rep1&type=pdf>>, Computer Networks: The International Journal of Computer and Telecommunications Networking—Web dynamics, vol. 50, Issue 10, Jul. 2006, 24 pages.

Bennett, et al., "Classification Enhanced Ranking," <<http://research.microsoft.com/en-us/um/people/sdumais/www2010-classenhancedranking.pdf>>, Proceedings of the 19th International Conference on World Wide Web, 2010, 10 pages.

Cao, et al., "Context-aware Query Suggestion by Mining Clickthrough and Session Data," retrieved at <<http://www.cs.sfu.ca/~jpei/publications/QuerySuggestion-KDD08.pdf>>, Proceeding of the 14th ACM SIGKDD International Conference on Knowledge Discovery and Data Mining, 2008, 9 pages.

Cao, et al., "Context-aware Query Classification," retrieved at <<http://research.microsoft.com/pubs/81350/sigir09.pdf>>, Proceedings of the 32nd International ACM SIGIR Conference on Research and Development in Information Retrieval, 2009, 8 pages.

Chirita, et al., "Using ODP Metadata to Personalize Search," retrieved at <<http://www.l3s.de/~chirita/publications/chirita05using.pdf>>, Proceedings of the 28th Annual International ACM SIGIR Conference on Research and Development in Information Retrieval, 2005, 8 pages.

Dou, et al., "A Large-scale Evaluation and Analysis of Personalized Search Strategies," retrieved at <<http://citeseerx.ist.psu.edu/viewdoc/download?doi=10.1.1.73.9755&rep=rep1&type=pdf>>, Proceedings of the 16th International Conference on World Wide Web, 2010, pp. 581-590.

Gao, et al., "Smoothing Clickthrough Data for Web Search Ranking," retrieved at <<http://research.microsoft.com/pubs/80246/click.gao-et-al.camera.v2.pdf>>, Proceedings of the 32nd International ACM SIGIR Conference on Research and Development in Information Retrieval, 2009, All pages.

Gauch, et al., "Ontology-based User Profiles for Search and Browsing," retrieved at <<http://citeseerx.ist.psu.edu/viewdoc/download?doi=10.1.1.9.3348&rep=rep1&type=pdf>>, Web Intelligence and Agent Systems, vol. 1, Issue 3-4, 2003, 27 pages.

Matthijs, et al., "Personalizing Web Search using Long Term Browsing History," retrieved at <<http://research.microsoft.com/pubs/139933/MatthijsRadlinski_WSDM2011.pdf>>, Proceedings of the Fourth ACM International Conference on Web Search and Data Mining, Feb. 2011, 10 pages.

Shen, et al., "Context-sensitive Information Retrieval using Implicit Feedback," retrieved at <<http://citeseer.ist.psu.edu/viewdoc/download:jsessionid=21E9565981492C9780A12509B9A72B09?doi=10.1.1.61.987&rep=rep1&type=pdf>>, Proceedings of the 28th Annual International ACM SIGIR Conference on Research and Development in Information, 2005, 8 pages.

Speretta, et al., "Personalizing Search based on User Search Histories," retrieved at <<http://ieeexplore.ieee.org/stamp/stamp.jsp?tp=&arnumber=1517922>>, Proceedings of the 2005 IEEE/WIC/ACM International Conference on Web Intelligence (WI'05), 2005, 7 pages.

Tan, et al., "Mining Long-term Search History to Improve Search Accuracy," retrieved at <<http://citeseer.ist.psu.edu/viewdoc/download?doi=10.1.1.61.1117&rep=rep1&type=pdf>>, Proceedings of the 12th ACM SIGKDD International Conference on Knowledge Discovery and Data Mining, 2006, 6 pages.

Teevan, et al., "Personalizing Search via Automated Analysis of Interests and Activities," retrieved at <<http://research.microsoft.com/en-us/um/people/sdumais/sigir2005-personalizedsearch.pdf>>, Proceedings of the 28th Annual International ACM SIGIR Conference on Research and Development in Information Retrieval, 2005, 8 pages.

White, et al., "Predicting Short-term Interests using Activity-based Search Context," retrieved at <<http://research.microsoft.com/en-us/um/people/ryenw/papers/whitecikm2010.pdf>>, Proceedings of the 19th ACM International Conference on Information and Knowledge Management, 2010, pp. 1009-1018.

White, et al., "Investigating Behavioral Variability in Web Search," retrieved at <<http://citeseer.ist.psu.edu/viewdoc/download?doi=10.1.1.112.1722&rep=rep1&type=pdf>>, Proceedings of the 16th International Conference on World Wide Web, 2007, 10 pages.

Zhai, et al., "Beyond Independent Relevance: Methods and Evaluation Metrics for Subtopic Retrieval," retrieved at <<http://citeseerx.ist.psu.edu/viewdoc/download?doi=10.1.1.14.6643&rep=rep1&type=pdf>>, Proceedings of the 26th Annual International ACM SIGIR Conference on Research and Development in Information Retrieval, 2003, 8 pages.

Liu, et al., "Personalized Web Search for Improving Retrieval Effectiveness," IEEE Transactions on Knowledge and Data Engineering, vol. 16, No. 1, 2004, pp. 28-40.

Pitkow, et al., "Personalized Search," retrieved at <<http://www.acm.org>>, Communications of the ACM, vol. 25, No. 9, 2002, pp. 50-55.

Wang, et al., "PSkip: Estimating Relevance Ranking Quality from Web Search Clickthrough Data," retrieved at <<http://www.acm.org>>, Proceedings of the 26th Annual International ACM SIGIR Conference on Research and Development in Information Retrieval, 2003, pp. 1355-1364.

Lu, et al., "Personalized Web Search Results with User's Location," Proceeding of the 33rd International ACM SIGIR Conference on Research and Development in Information Retrieval, Jul. 2010, pp. 763-764.

Wu, et al., "Ranking, Boosting, and Model Adaptation," retrieved at <<http://research.microsoft.com/pubs/69536/tr-2008-109.pdf>>, Microsoft Research Technical Report MSR-TR-2008-109, Microsoft Corporation, Redmond, Washington, 2008, pp. 1-23.

Daoud, et al., "A Session Based Personalized Search Using an Ontological User Profile," retrieved at <<http://www.acm.org>>, Proceedings of the 2009 ACM Symposium on Applied Computing, 2009, pp. 1732-1736.

Shen, et al., "Analysis of Topic Dynamics in Web Search," retrieved at <<http://www.acm.org>>, WWW'05 Special Interest Tracks and Posters of the 14th International Conference on World Wide Web, 2005, pp. 1102-1103.

Craswell, "Random Walks on the Click Graph", Proceedings of the SIGIR Conference on Research and Development in Information Retrieval, Jul. 23-27, 2007, all pages.

Grant, "CVX: Matlab Software for Disciplined Convex Programming", Apr. 17, 2011, all pages.

Jordan, "Graphical Models", Statistical Science, Feb. 2004, all pages.

Teevan, "To Personalize or Not to Personalize: Modeling Queries with Variation in User Intent", Proceedings of the SIGIR Conference on Research and Development in Information Retrieval, Jul. 20-24, 2008, all pages.

Teevan, "Potential for Personalization", ACM Transactions on Computer-Human Interaction, Mar. 9, 2010, all pages.

* cited by examiner

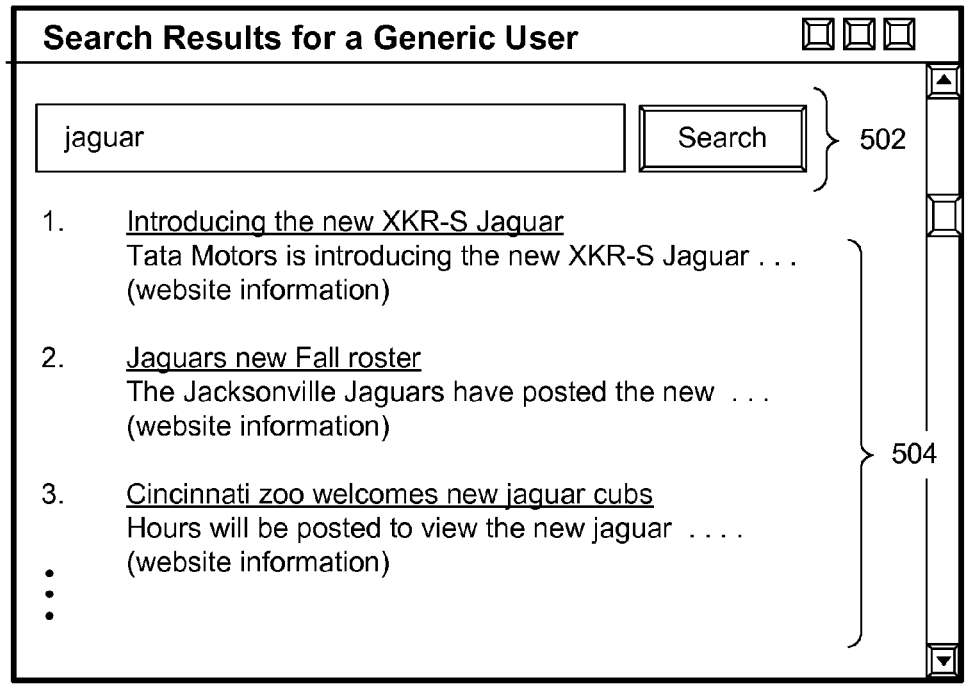
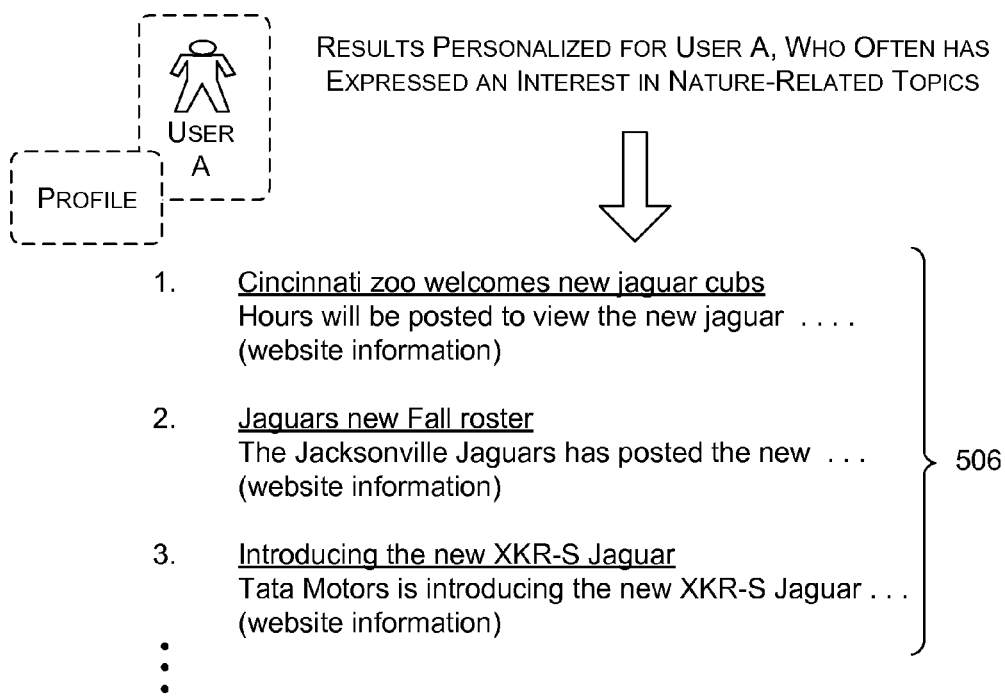
FIG. 5

| USER | QUERY-INDEPENDENT DISTRIBUTIONS (CAN BE COMPUTED OFFLINE) | QUERY-DEPENDENT DISTRIBUTIONS (CAN BE COMPUTED ONLINE) |
|---|---|---|
| GENERIC USER | $Pr_r(T)$ FOR GENERIC USER<br><br>• NEWS .543<br>• SPORTS .142<br>• WEATHER .044<br>⋮ | $Pr_r(T \mid q)$ FOR QUERY = "JAGUAR" FOR GENERIC USER<br><br>• AUTOMOTIVE .342<br>• SPORTS .145<br>• NATURE .023<br>⋮ |
| PARTICULAR USER A | $Pr(T_u \mid \theta_u)$ FOR THE PARTICULAR USER A<br><br>• CONSERVATION .644<br>• LITERATURE .435<br>• TRAVEL .009<br>⋮ | $Pr(T_u \mid q, \theta_u)$ FOR QUERY = "JAGUAR" AND USER A<br><br>• NATURE .644<br>• AUTOMOTIVE .135<br>• SPORTS .099<br>⋮ |

FIG. 6

FUNCTIONALITY FOR PERSONALIZING SEARCH RESULTS

BACKGROUND

A search engine uses a ranking model to respond to a user's query, typically by generating search results in the form of a ranked list of search result items. In many cases, the ranking model determines the ranking of items in a user-agnostic manner. As such, the search engine will deliver the same search results to two distinct users who submit the same query. This behavior is satisfactory in many cases. However, the search engine can be expected to offer less optimal results for any user who has a specialized search intent that is not adequately addressed by the search engine's ranking model.

To address this issue, the research community has proposed numerous techniques for personalizing the behavior of a search engine based on the assessed characteristics of individual users. However, there is room for improvement in this field of research.

SUMMARY

An illustrative query processing system is described for providing personalized results to a particular user u. The query processing system operates by receiving a query q from the particular user who intends to find results that satisfy the query with respect to a topic $T_u$, where the user is characterized by user information $\theta_u$. The query processing system then produces a generic topic distribution $Pr_r(T|q)$ associated with the query that is germane to a population of generic users, as well as a user-specific query-dependent topic distribution $Pr(T_u|q,\theta_u)$ that specifically pertains to the particular user. The query processing system then produces personalized results for the particular user based at least on $Pr_r(T|q)$ and $Pr(T_u|q,\theta_u)$ (or, in another implementation, based on just $Pr(T_u|q,\theta_u)$).

According to another illustrative aspect, the query processing system can be applied to environments which characterize users and items using other types of latent variables, such as reading level, geographic location, etc.

According to another illustrative approach, the query processing system can produce $Pr(T_u|q,\theta_u)$ using different techniques. In a first technique, the query processing system applies Bayes' theorem to produce $Pr(T_u|q,\theta_u)$ based on a language model, together with $Pr(T_u|\theta_u)$ (a user-specific query-independent distribution). In another approach, the query processing system can produce $Pr(T_u|q,\theta_u)$ by reweighting $Pr_r(T|q)$ based on user-specific multipliers. In one approach, the query processing system can learn the user-specific multipliers in direct fashion using a discriminative learning technique.

According to another illustrative aspect, a generating system can produce $Pr(T_u|\theta_u)$ for a particular user in an offline process, based on training data. More specifically, in one case, $Pr(T_u|\theta_u)$ reflects a long-term profile for the user. In another case, $Pr(T_u|\theta_u)$ reflects a short-term profile.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows an example of personalized results that may be produced using the query processing environment of FIG. 2.

FIG. 6 shows a sample of a generic query-independent topic distribution $Pr_r(T)$, a generic query-dependent topic distribution $Pr_r(T|q)$, a user-specific query-independent distribution $Pr(T_u|\theta_u)$, and a user-specific query-dependent topic distribution $Pr(T_u|q,\theta_u)$ that can be produced by the query processing system of FIG. 2.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative query processing environment for personalizing results for a particular user. Section B describes illustrative methods which explain the operation of the query processing environment of Section A. Section C describes illustrative computing functionality that can be used to implement any aspect of the features described in Sections A and B.

Figure 12:
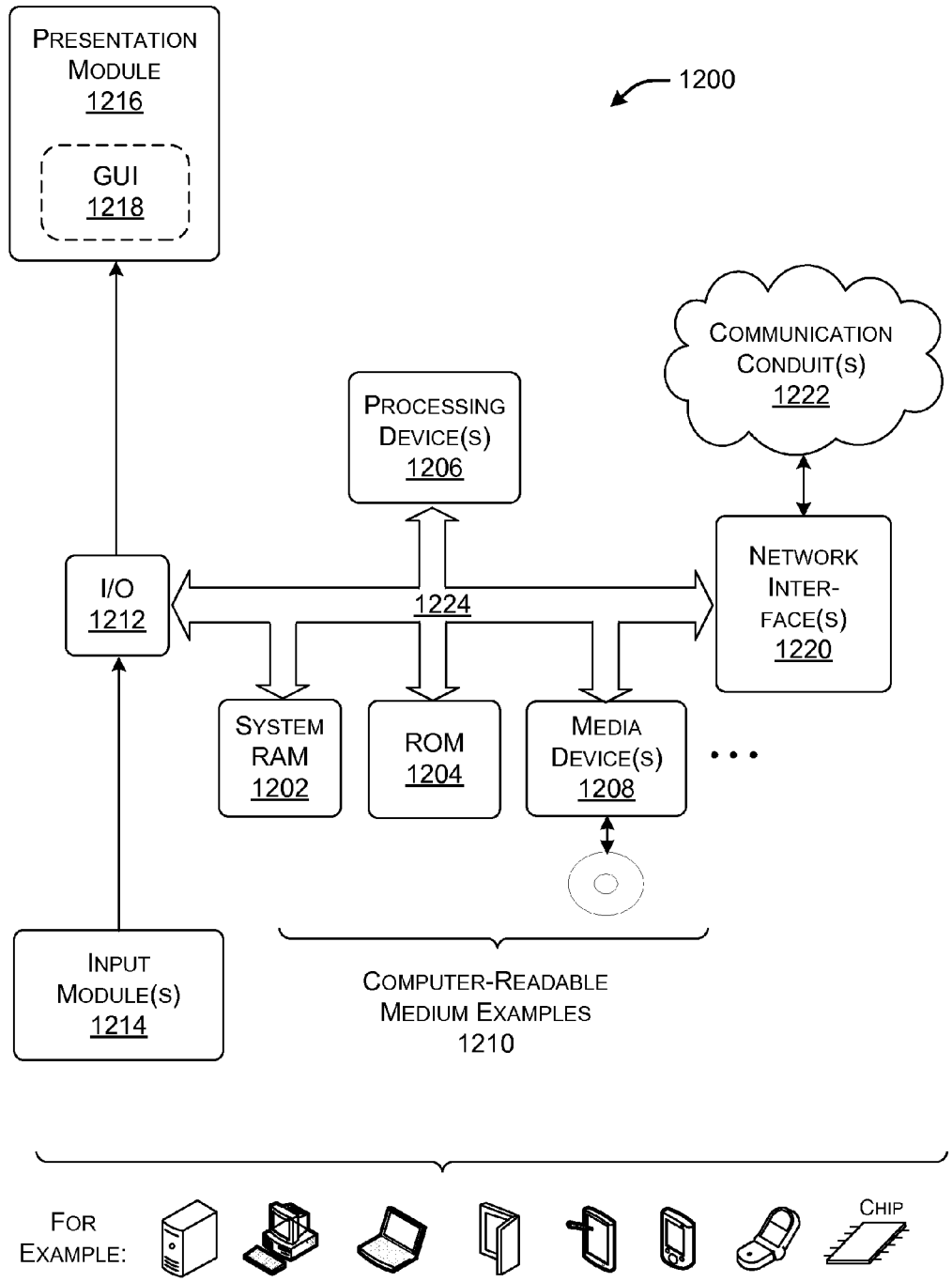
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Personalization Environment

Figure 1:
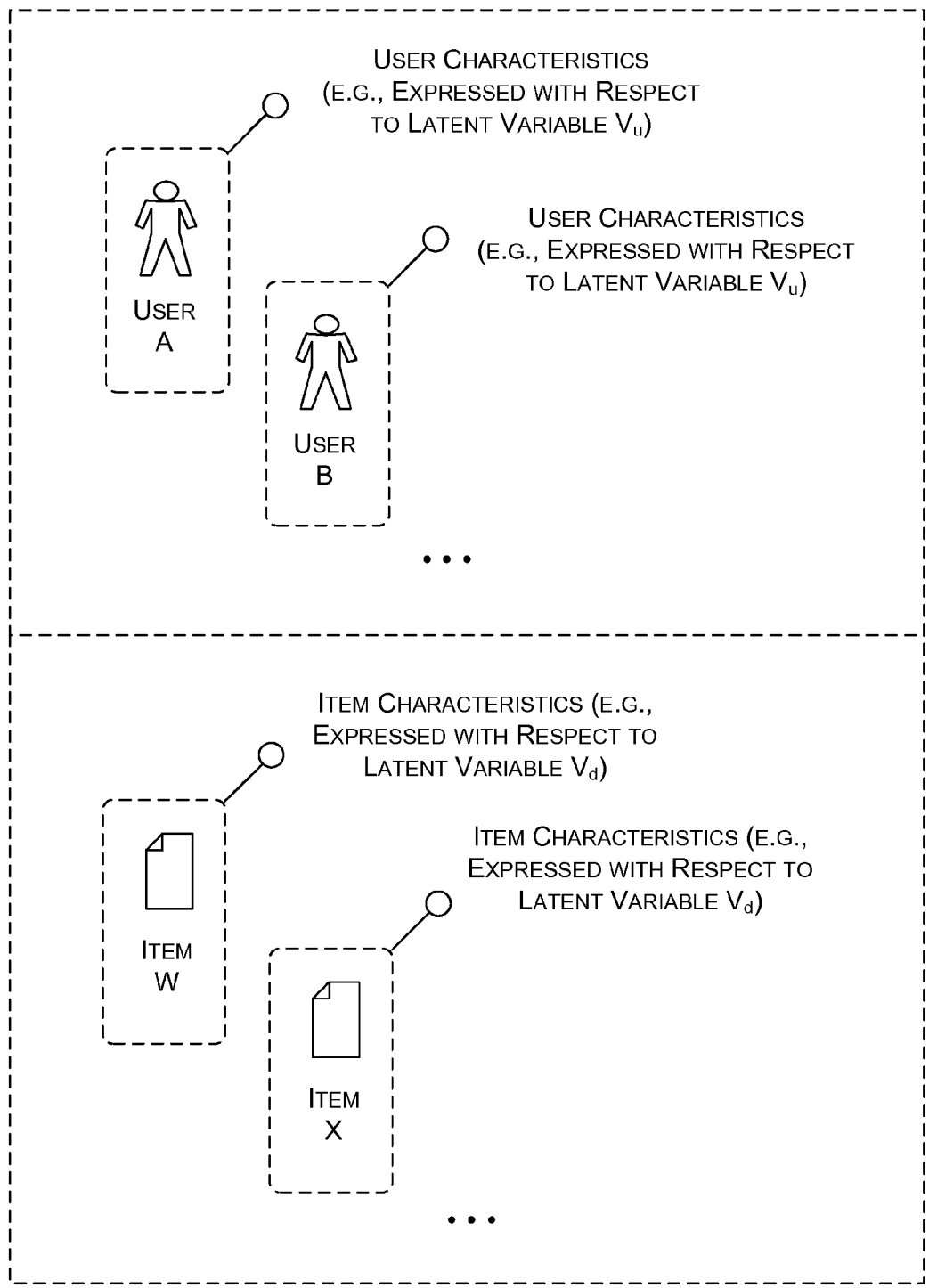
FIG. 1 shows a conceptual framework in which each user is associated with a user profile, expressed with respect to at least one latent variable; further, each item is associated with item characteristics, expressed with respect to at least one latent variable.

A query processing environment is described herein which personalizes results (e.g., search results) with respect to one or more latent variables. More specifically, FIG. 1 shows a conceptual framework in which each user u who is performing a search is characterized with reference to at least one latent variable, $V_u$. That is, the variable $V_u$ identifies some property of an item being sought by the user in the context of the submission of a query q. Each item is also characterized with reference to at least one latent variable, $V_d$, which identifies a property of the item itself. The query processing environment 200 leverages these variables by attempting to identify search results for which the characteristics of the identified items (as represented by the latent variable $V_d$) are determined to satisfy the identified needs of the user (as represented by the query and the latent variable $V_u$) according to some specified function $f$ based on $V_u$ and $V_d$.

In most of the examples which follow, the variable $V_u$ describes a topic of a document that the user is seeking in the context of the submission of a query. In that context, $V_u$ is referred to as $T_u$, having discrete states corresponding to different topics. For example, assume that $T_u$ has three discrete states, corresponding to the topics of "computer science," "electrical engineering," and "physics." In performing a search at a particular time, the user is presumed to have an intent associated with a single topic; for example, the user may be looking for a document that: (a) satisfies the query; and (b) is associated with the field of "electrical engineering." Similarly, the variable $V_d$ describes the topic actually associated with a particular document d. In that context, $V_d$ is referred to as $T_d$, having discrete states corresponding to different topics. The document is presumed to have a topic corresponding to one of the discrete states of $T_d$; for example, a particular candidate document may pertain to the field of "physics."

In general, the topics can refer to any respective categories defined with respect to any categorization paradigm (and/or defined in an ad hoc manner without reference to an established categorization paradigm). A topic may alternatively be interpreted as a field, a class, a domain, an area, etc.

In the above topic-related application, the query processing environment attempts to identify documents which satisfy the query of the user in the context of the assessed topical intent of the user in performing a search, according to some function $f$ based on $T_u$ and $T_d$. That is, consider a user who inputs the query "resistance," where that user is interested in finding documents pertaining to resistance in the context of "electrical engineering," rather than, for example, political science. The query processing environment attempts to find documents that satisfy the query within the appropriate field of electrical engineering. However, at the time of performing the search, the query processing environment may not know the topic associated with the user's search intent or the topic associated with each candidate document. As will be described, the query processing environment addresses this issue by performing ranking based on various topic-based probability distributions. For example, one such probability distribution that may play a role in providing a personalized ranking is $Pr(T_u|\theta_u)$. $Pr(T_u|\theta_u)$ corresponds to a user-specific query-independent distribution of topics (describing possible topics that a user u may be looking for when submitting any query). That distribution can be expressed as a list of topics (e.g., "computer science," "electrical engineering," "physics," etc.) and associated numbers which reflect the respective strengths of those topics. In general, the distributions help disambiguate the intent of the user in submitting the query "resistance."

As to terminology, reference to a discrete variable (such as TO pertains to a particular topic selected from a defined group of topics. Reference to a discrete variable in the context of a probability distribution (such as $Pr(T_u| \ldots )$) pertains to a distribution over plural topics. Reference to a topic T (without a subscript) refers to a particular topic selected from a group of possible topics, without reference to any particular user or particular document.

Although topic-based personalization is featured in this document, the principles described herein extend to other types of latent variables. For example, in another case, the variable $V_u$ describes the user's desired reading level. The variable $V_d$ corresponds to an actual reading level associated with a particular document. In this setting, the query processing environment attempts to find documents which match an appropriate reading level of a particular user. In another case, the variable $V_u$ corresponds to the geographic location of the user, while the variable $V_d$ corresponds to the geographic location of a particular item.

Further, as set forth in Section B, the principles described herein extend to personalization that is performed with respect to combinations of two or more latent variables, such as document topic and geographic location. Further, as set forth in Section B, the principles set forth herein apply to cases in which each item can be characterized by two or more states associated with a latent variable (e.g., where each document can be characterized by two or more topics associated with $T_u$).

Further, the query processing environment can form distributions associated with groups or classes of users, rather than, or in addition to, an individual user. For example, the query processing environment can form a probability distribution which characterizes the search intent of a certain demographic group (such as male users, ages 20-30), when those users submit a particular query q. Hence, $T_u$ can refer to the topical search intent of one particular user, or any user u associated with a particular group of users.

Figure 2:
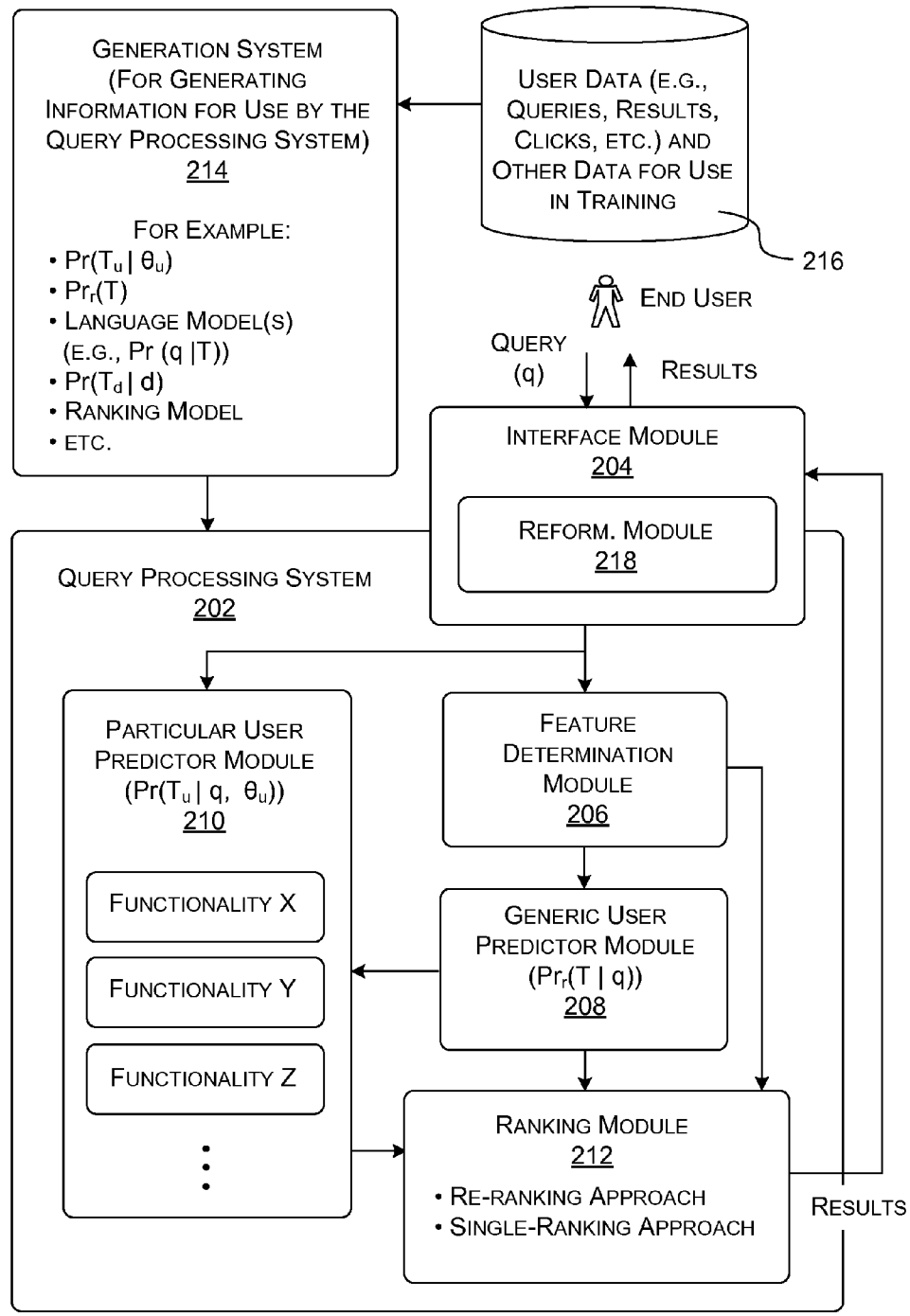
FIG. 2 shows an illustrative query processing environment for personalizing results for a particular user.

FIG. 2 shows one implementation of the query processing environment 200. In this implementation, the particular user submits a query to a query processing system 202. The query processing system 202 processes the query, generates personalized search results, and forwards the personalized search results to the user. In one case, the search results may comprise a ranked list of documents which match the needs of the user (as well as satisfy the query).

The principles described herein can also be applied to other scenarios. For example, in another case, the query processing environment 200 can provide product suggestions to the user based on the user's assessed needs. Alternatively, or in addition, the query processing environment 200 can present advertisements to the user based on the assessed needs of the user. Alternatively, or in addition, the query processing environment 200 can provide one or more alternative query suggestions for the user's consideration (or the query processing environment 200 can automatically identify and apply one or more alternative query suggestions). In other words, the term "personalized results" can encompass other outcomes of personalization besides (or in addition to) a ranked list of result items.

Further, the query processing environment 200 can process a "query" which may implicitly reflect the contextual setting in which the user interacts with any application or other functionality, rather than (or in addition to) an explicit query input into a browser by the user. For example, the user may be investigating a certain part of an online catalog, from which his or her informational needs can be inferred. Or the user may be writing (or receiving) an Email message pertaining to a certain topic, from which his or her informational needs can be inferred. However, to facilitate explanation, the examples set forth herein will primarily describe the case in which the query processing environment 200 functions in the role of a search engine, that is, by responding to queries expressly submitted by users. For example, the functionality described herein can be incorporated into any commercial search engine functionality, such as the Bing™ search engine provided by Microsoft Corporation of Redmond, Wash.

Further, in the examples set forth herein, the search results describe items that correspond to documents, such as pages that can be accessed via a wide area network (such as the Internet). But the principles described herein can also be applied to other settings in which the items correspond to other resources, such as records in a database. In that context, the query processing environment 200 may correspond to a database query processing system.

The query processing environment 200 includes (or can be conceptualized to include) a collection of modules which perform respective functions. In one implementation, the query processing environment 200 may adopt a flexible and extensible design. This means that any functional module shown in FIG. 2 can be replaced with another module that achieves the same end-objective, without requiring adaptation of other modules in the query processing environment 200.

To begin with, the query processing system 202 includes an interface module 204 for receiving a query from a user u. More specifically, in submitting the query, q, the user is presumed to be attempting to find at least one document, d, that satisfies the query and has a single desired target topic, $T_u$, where, as said, that topic is selected from a group of possible topics corresponding to the possible discrete states of $T_u$. The user himself or herself is characterized by user information, $\theta_u$. As will be set forth below, the user information $\theta_u$ can be expressed in various forms, such as one or more topic-based probability distributions. In addition, or alternatively, $\theta_u$ can be expressed by a collection of parameters that can be learned in a discriminative manner based on training data.

A feature determination module 206 generates features that can be used to characterize any aspect(s) of a context in which a user is attempting to find information. For example, the feature determination module 206 can generate features that characterize each combination of a query and a candidate document under consideration. More specifically, one type of feature describes a characteristic of the query itself (such as a linguistic property of the query). Another type of feature describes a characteristic of the candidate document itself. Another type of feature describes a characteristic which depends on a combination of the query and the candidate document, and so on. Other features may describe the setting or circumstance in which a user is conducting a search, potentially independent of the query. For example, features may describe characteristics of the user, characteristics of the user's search location, characteristics of the time at which the user is conducting a search, and so on. More generally stated, any search engine functionality can be used to generate the features that characterize the user's submission of the query.

As used herein, the term search engine functionality can refer to any engine which retrieves results using a search index in conjunction with a ranking algorithm. But the term search engine functionality also encompasses alternative engines for retrieving results based on any input query, where, as said, the query can refer to an inquiry that is implicitly and/or explicitly specified by the user. For example, as broadly used herein, a search engine encompasses a product recommendation engine, an advertisement selection engine, etc.

A generic user predictor module 208 produces a query-dependent generic topic distribution $Pr_r(T|q)$ (referred to below, for brevity, as a generic topic distribution). The generic topic distribution provides information regarding the topics (T) that a general class of users are typically seeking when these users submit a query q. The subscript "r" in $Pr_r(T|q)$ indicates that the generic topic distribution applies to any random user who is represented by such a generic class of users. The generic topic distribution $Pr_r(T|q)$ can also be referred to as a background model, insofar as it defines the baseline behavior of the query processing system 202, without considering the specific characteristics of a particular user.

The generic user predictor module 208 can formulate $Pr_r(T|q)$ as a list of topics and respective weights. The weight associated with a particular topic identifies the strength or popularity of that topic among the generic class of users. Section B describes an illustrative technique for generating the generic topic distribution $Pr_r(T|q)$. By way of overview, the generic user predictor module 208 may produce $Pr_r(T|q)$ based on search results provided by general-purpose search engine functionality. That is, insofar as this functionality is designed to provide results that are applicable to a wide class of users in an undifferentiated manner, the output of this functionality represents an appropriate resource to mine in generating $Pr_r(T|q)$.

In contrast, a particular user predictor module 210 produces a user-specific query-dependent topic distribution $Pr(T_u|q,\theta_u)$. This distribution identifies the topic $T_u$ that a particular user u is likely seeking, given that the user has submitted the query q. Like the generic topic distribution, the particular user predictor module 210 can represent $Pr(T_u|q,\theta_u)$ as a list of topics and respective weights.

As Section B will set forth, the particular user predictor module 210 can use one or more techniques to produce $Pr(T_u|q,\theta_u)$. FIG. 2 generally labels these techniques as functionality X, functionality Y, functionality Z, etc. For example, in one approach, the particular user predictor module 210 can produce $Pr(T_u|q,\theta_u)$ using a language model in conjunction with a user-specific query-independent distribution $Pr(T_u|\theta_u)$ (where $Pr(T_u|\theta_u)$ describes a prior probability that the particular user searches for a topic, independent of the query). In another approach, the particular user predictor module 210 can produce $Pr(T_u|q,\theta_u)$ by reweighting the generic topic distribution $Pr_r(T|q)$, e.g., using a generative technique or a discriminative technique (to be described in Section B below).

A ranking module 212 produces personalized search results for the particular user based on one or more of the features (produced by the feature determination module 206), the generic topic distribution $Pr_r(T|q)$ (produced by the generic user predictor module 208), and the user-specific query-dependent topic distribution $Pr(T_u|q,\theta_u)$ (produced by the particular user predictor module 210). In some cases, the ranking module 212 can also leverage plural different methods of generating $Pr(T_u|q,\theta_u)$ in generating search results. The interface module 204 then forwards the personalized search results to the user.

In one case the ranking module 212 performs its ranking function in a single-stage manner based on the features provided by the feature determination module 206, as well as features derived from topic distributions (e.g., $Pr_r(T|q)$, $Pr(T_u|q,\theta_u)$, etc.). For example, illustrative features may include: the length of the query in characters or words; the entropy of the result set's topics; the amount of user data that is associated with the particular user; an indication of the last time the user interacted with the query processing system 202; information derived from $Pr_r(T|q)$ by itself; information derived from $Pr(T_u|q,\theta_u)$ by itself; information derived from a divergence or other joint consideration of $Pr_r(T|q)$ and $Pr(T_u|q,\theta_u)$, and so on. The ranking module 212 can take into consideration all or some of the above-described features in performing its ranking function.

In another case, the ranking module 212 first produces an initial ranking based on just the features provided by the feature determination module 206. In other words, this initial ranking reflects a "standard" ranking of search results provided by any search engine functionality, possibly without personalization. The ranking module 212 then applies (in one implementation) $Pr_r(T|q)$ and $Pr(T_u|q,\theta_u)$ to reweight the initial search results, producing a new ordering of items in the search results. This type of algorithm can be referred to as a dual-stage (or multistage) algorithm because it produces its results in multiple stages.

Alternatively, or in addition, the ranking module 212 can also incorporate some of the original (unmodified) search results from the search engine functionality in the final search results that it forwards to the user. For example, the query processing system 202 can retain the top-ranked search result item (or plural items) in the initial results without subjecting the item(s) to re-ranking. In another application, the ranking module 214 can perform a "deep search" by applying the personalization-based re-ranking technique to extract potentially relevant documents deep within the initial list of ranked search results (e.g., starting at position 200 in the initial list), e.g., by boosting the relevance of these low-ranked documents based on $Pr(T_u|q,\theta_u)$.

In certain circumstances, the ranking module 212 may decide to forego personalization or otherwise reduce the amount of personalization that it performs. For example, the ranking module 212 may decide to omit or reduce personalization when the query that the user has submitted is sufficiently unambiguous. In addition, or alternatively, the ranking module 212 may decide to omit or reduce personalization when insufficient information is available to accurately perform this task. For example, assume that the query processing system 202 has never previously encountered the words in a particular query. In this case, the query processing system 202 will conclude that it does not have sufficient information to appropriately calculate $Pr(q|T)$ (referred to as a language model of q, given T). As will be described in Section B, the ranking module 212 can also leverage uncertainty information associated with the probabilistic models in determining an extent to which personalization is performed.

In one manner of operation, the query processing system 202 performs its functions in a dynamic manner, meaning that the query processing system 202 provides the search results to a user shortly after the submission of a query. The query processing environment 200 can also include a generation system 214 for generating various information items that play a supporting role in the dynamic computations performed by the query processing system 202. In one case, the generation system 214 performs its operation in an offline manner, meaning any time prior to the submission of a particular query by the user. But, more generally, any functions that are described herein as being performed offline can alternatively, or in addition, be performed in an online dynamic manner. Similarly, any functions that are described herein as performed online can alternatively, or in addition, be performed in an offline manner. For example, the generation system 214 can periodically or continuously update its information as new data is received for analysis by the query processing environment 200.

FIG. 2 identifies an illustrative list of information items that can be provided by the generation system 214, each of which will be described in Section B. By way of overview, as one information item, the generation system 214 produces a user-specific query-independent distribution, $Pr(T_u|\theta_u)$. That distribution describes the prior probability that the particular user u will search for any topic associated with the discrete-valued variable $T_u$, independent of any query. More specifically, for each user, this distribution $Pr(T_u|\theta_u)$ can be expressed as a list of topics and associated weights. The topics in the distribution represent topical fields of interest exhibited by the user on prior occasions. The weights indicate the respective strengths of those interests. The generation system 214 can produce a counterpart query-independent distribution $Pr_r(T)$ for the case of generic users.

Overall, the distribution $Pr(T_u|\theta_u)$ reflects a profile of the user. As will be described in Section B, the generation system 214 produces $Pr(T_u|\theta_u)$ based on user data provided in a data store 216. The user data may reflect any prior behavior of the user which evinces his or her topical interests, and/or any other information which can be mined to determine the topical interests of the user. For example, the user data may describe prior queries submitted by this user, prior search results returned in response to the queries, and actions taken (and/or not taken) by the user in response to receiving the search results. For example, the user data may identify items in the search results that the user has "clicked on" or otherwise acted on. In addition, or alternatively, the user data may identify browsing actions performed by the user, desktop activities including document or email creation and reading patterns, etc.

In one example, the user profile may reflect a long-term profile associated with the user, e.g., which may extend over hours, days, weeks, months, years, etc. Alternatively, or in addition, the user profile may reflect a short-term profile. For example, the user profile may reflect the interests expressed by a user in a same search session, and thus can encompass even user behavior that occurred just a few seconds or minutes in the past.

Finally, the generation system 214 can use any offline and/or online training method to produce (and subsequently update) the ranking model that is used by the ranking module 212, in either the single-stage mode of operation or the dual-stage mode of operation. For example, the generation system 214 can collect a corpus of training data that reflects the online activity of a population of users. The generation system 214 can then use any type of training functionality to derive the ranking model based on the training data, such as, but not limited to, the LambaMART technique described in Wu, et al., "Ranking, Boosting, and Model Adaptation," Microsoft Research Technical Report MSR-TR-2008-109, Microsoft® Corporation, Redmond, Wash., 2008, pp. 1-23

More specifically, the online activity can correspond to queries submitted by the users, search results provided to the users by the search engine functionality in response to the queries, clicks or other actions taken by the users in response to receiving the search results, etc. The generation system 214 forms the training data from this online activity by considering respective pairings of queries and search result items that were presented to the users. For example, the generation system 214 can specify a set of training features that capture different aspects of each such pairing. At least some of those training features may correspond to the personalization-based features described in greater detail in Section B. The generation system 214 also applies a label to each pairing of a query and a search result item, indicating the extent to which the search result item satisfies the query. In one case, the generation system 214 can rely on a human analyst to manually supply the judgment labels. In addition, or alternatively, the generation system 214 can automatically apply these labels, e.g., by inferring judgments based on click selections made (or not made) by the users. (For example, a user who clicks on a search result item may be considered to have expressed a judgment that the item satisfies the user's query.) The training algorithm then produces the ranking model based on this corpus of training data, e.g., by generally attempting to learn the manner in which different combinations of features map to the identified judgments.

Figure 3:
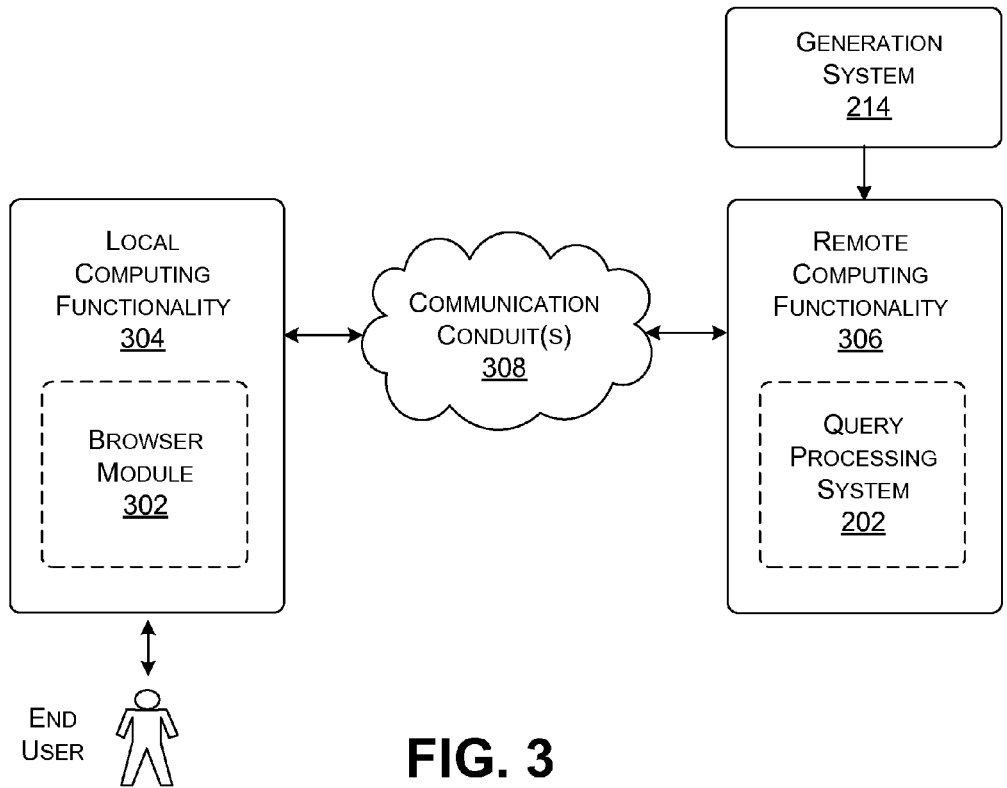
FIG. 3 shows one implementation of the query processing environment of FIG. 2.

FIG. 3 describes one implementation of the query processing environment 200 of FIG. 2. In that implementation, a user uses browsing functionality 302 provided by local computing functionality 304 to access the query processing system 202. Remote computing functionality 306 may implement the query processing system 202. A communication conduit 308 couples the local computing functionality 304 with the remote computing functionality 306.

The generation system 214 interacts with the data store 216 (not shown in FIG. 3) and the query processing system 202. The generation system 214 and the query processing system 202 can be implemented at the same site or different respective sites. Further, the generation system 214 and the query processing system 202 can be implemented by the same entity or different respective entities.

The local computing functionality 304 may represent any type of computing device, such as a personal computer, a computer workstation, a laptop computer, a game console device, a set-top box device, a personal digital assistant (PDA), a mobile telephone, a tablet-type computer, an electronic book-reader device, and so on. The remote computing functionality 306 may represent one or more server computers and associated data stores, etc., provided at a central location or distributed over plural locations. The communication conduit 308 represents any type of local area network, any type of wide area network (e.g., the Internet), any type of point-to-point connection, and so on, or any combination thereof, governed by any protocol or combination of protocols.

In an alternative implementation, the local computing functionality 304 can implement the entire query processing system 202 or at least parts of the query processing system 202.

Figure 4:
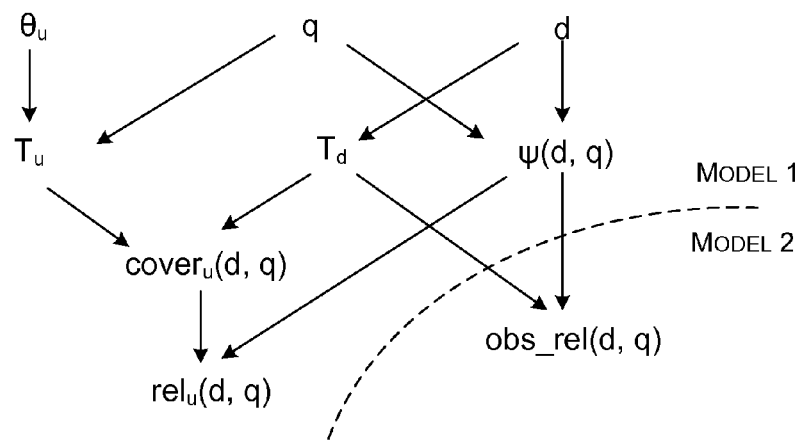
FIG. 4 shows a graphical model that underlies one manner of operation of the query processing environment of FIG. 2.

FIG. 4 shows a graphical model that underlies one manner of operation of the ranking module 212 of the query processing system 202. In this example, a user u, who is characterized by user information $\theta_u$, submits a query q. The user is searching for a document that satisfies the query and has a desired topic $T_u$. An actual candidate document d has a topic $T_d$. The variables $\theta_u$, q, and d are considered known. The variable $\psi(d,q)$, referred to as a non-topical relevance score, corresponds to the user-independent probability that the document is relevant to the query. The ranking module 212 can produce $\psi(d,q)$ based on an original relevance score provided by any search engine functionality. Hence, in a first approach, $\psi(d,q)$ is considered an observed variable which is provided by search engine functionality. In a second approach, described below, $\psi(d,q)$ is not considered an observed variable.

The variable $\text{cover}_u(d,q)$ is 1 if $T_d$ "covers" (e.g., addresses) the information need $T_u$, and 0 otherwise. In one implementation, the conditional distribution $\text{Pr}(\text{cover}_u(d,q)|T_u, T_d)$ can be expressed as $1[T_u = T_d]$, meaning that this distribution equals 1 when $T_u = T_d$. More generally, $\text{Pr}(\text{cover}_u(d,q)|T_u, T_d)$ can be expressed as a function of some distance between topics $T_u$ and $T_d$ (e.g., some measure of similarity between these two topics). For example, in one representative implementation, $\text{Pr}(\text{cover}_u(d,q)|T_u, T_d)$ equals: i) 1 if $T_u = T_d$, ii) 0.1 if topics $T_u$ and $T_d$ share a top-level category in a hierarchical ontology (e.g., topics "computer science" and "software" share the top-level topic of "computers"); and iii) 0 otherwise. Alternatively, or in addition, $\text{Pr}(\text{cover}_u(d,q)|T_u, T_d)$ can reflect a distribution that is learned based on training data.

Finally, in one approach, the variable $\text{rel}_u(d,q)$ is set to 1 if the user u considers a document d relevant to the query, and is set to 0 otherwise. The probability $\text{Pr}(\text{rel}_u(d,q)=1|\text{cover}_u(d,q),\psi(d,q))$ equals 0 if $\text{cover}_u(d,q)=0$, and equals $\psi(d,q)$ otherwise. In another approach, the variable $\text{rel}_u(d,q)$ can express a range of relevance values.

The following formula is obtained by integrating over all latent variables (e.g., $T_u$, $T_d$).

$$Pr(rel_u(d, q) = 1 \mid \theta_u, q, d, \psi(q, d)) \quad (1)$$
$$= \psi(d, q) \sum_{T_d} Pr(T_d \mid d) \alpha(T_d),$$

where, $$\alpha(T_d) = \sum_{T_u} Pr(T_u \mid q, \theta_u) Pr(cover_u(d, q) = 1 \mid T_u, T_d).$$

More specifically, it is assumed that the user has a particular single search intent ($T_u$) and each candidate document has a single topic ($T_d$). But since these may not be known at the time of search, Equation (1) performs aggregation over $T_u$ and $T_d$. If $T_u$ and $T_d$ are known, then such aggregation would be omitted.

The ranking module 212 can apply Equation (1) in different ways. Generally, the score provided by Equation (1) can be considered as a feature for a particular document d and a particular q. The ranking module 212 can use this feature to determine the final ranking of this document in the list of search results. In one case, the ranking module 212 uses the output of Equation (1) as the sole consideration in determining the relevance of d to q. In another case, the ranking module 212 uses the output of Equation (1) as one feature, in combination with one or more other features, in determining the relevance of d to q. In both cases, the influence of Equation (1) allows the ranking module 212 to take into account the query-particular needs of the user (e.g., as reflected by the user-specific query-dependent distribution $Pr(T_u|q,\theta_u)$).

The approach described above assumes that the search engine functionality provides the non-topical relevance score $\psi(q,d)$. However, this is an approximation; it actuality, it may be difficult to produce a score which fully summarizes the complete non-topical contribution to relevance. More specifically, the search engine functionality may be trained based on the online activity of a large group of users. If so, the search engine functionality may generate results for a query which are biased with respect to the interests of this group of users. For example, consider the query "Jaguar." If most people who input "Jaguar" are interested in finding documents about the automobile Jaguar, then the search results will favor documents pertaining to the automobile Jaguar, as opposed to the animal jaguar.

To address this issue, the ranking module 212 can perform ranking in a manner which takes into account the generic topic distribution $Pr_r(T|q)$ of the "generic" user, as well as $Pr(T_u|q,\theta_u)$, thereby expressly modeling the biasing effect described above. More specifically, the ranking module 212 can compute a relevance score (rel score) associated with a particular document d and query a by multiplying an original relevance score (obs(d,q)) by a reweighting factor. For example, rel score can be expressed as:

$$obs(d, q) \sum_{T_d} Pr(T_d \mid d) \frac{\sum_{T_u} Pr(T_u \mid q, \theta_u) f(T_u, T_d)}{\sum_T Pr_r(T \mid q) f(T, T_d)}, \quad (2)$$

where $f(T,T_d)$ is $Pr(cover(d,q)=1|T,T_d)$. T is a topic over which aggregation is performed. The numerator of Equation (2) corresponds to $\alpha(T_d)$ of Equation (1). Any search engine functionality can provide the original relevance score obs(d, q), e.g., based on its general-purpose ranking model. Equation (2) satisfies the following invariance property: when $Pr_r(T|q)$ is the same as $Pr(T_u|q,\theta_u)$, the ranking module 212 does not modify an original obs(d,q) score.

As in the case of Equation (1), the ranking module 212 can treat the output of Equation (2) as a feature for a particular d and q. The ranking module 212 can use that feature as the sole factor in assessing the relevance of the document in the final search results, or just one feature among other features. Further, Equations (1) and (2) can also be modified so that they depend one or more additional considerations, not presently specified in Equations (1) and (2).

In summary, FIG. 4 labels the conceptual framework for Equation (1) (which does not take into consideration the generic topic distribution) as model 1. FIG. 4 labels the conceptual framework for Equation (2) (which does take into consideration the generic topic distribution) as model 2.

To repeat, however, the ranking module 212 can alternatively employ a single-stage process to generate the search results, e.g., without first generating an initial ranking (associated with obs(d,q)). In that scenario, the ranking module 212 can add features associated with $Pr_r(T|q)$ and/or $Pr(T_u|q, \theta_u)$ to a feature vector, which is then used by a ranking algorithm to determine the ranking of documents.

Further, the equations developed above can be applied to other environments that are characterized by other latent variables. For example, with respect to the latent variable of reading level, a distribution $Pr(V_u|q,\theta_u)$ can reflect a user-specific distribution of reading level proficiencies with respect to a particular query q. The distribution $Pr_r(V|q)$ reflects the distribution of reading level proficiencies for a random user that issues the particular query q. These two distributions can be applied to Equation (2) to provide a personalized ranking for a user based on reading level, rather than, or in addition to, topics.

Advancing to FIG. 5, this figure shows the behavior of the query processing environment 200 of FIG. 2 for an illustrative scenario. In that example, assume that a particular user inputs the query "jaguar" into an input field 502 of an interface provided by the interface module 204. First assume that the query processing system 202 does not take into consideration the user's profile, which expresses his or her prior topic preferences. In that case, the query processing system 202 generates illustrative search results 504, identifying a document pertaining to the automobile named "Jaguar" as a top-ranking search result item. The second search result item pertains to the American football team named the "Jaguars." The third search result item pertains to the animal named "jaguar." This hypothetical ranking may reflect the fact that most users are interested in finding information regarding the automobile named Jaguar when they input the query "jaguar."

Now assume that the query processing system 202 takes into account the topic preferences of a particular user. Further assume that the particular user has a user profile which indicates that he or she is interested in zoological topics and nature-related topics. Hence, the query processing system 202 may generate search results 506, which now elevates the document pertaining to the animal jaguar as the top-ranking search result item.

FIG. 6 shows a small sample of the distribution of topics associated with $Pr_r(T)$ (the query-independent generic topic distribution), $Pr_r(T|q)$ (the query-dependent generic topic distribution), $Pr(T_u|\theta_u)$ (the user-specific query-independent distribution), and $Pr(T_u|q,\theta_u)$ (the user-specific query-dependent topic distribution). Each distribution includes a list of topics and weights associated therewith. As explained above, a weight identifies the popularity of a particular topic.

In the merely illustrative example of FIG. 6, the generic topic distribution $Pr_r(T|q)$ may indicate that, when most people input the query "jaguar," they are predominantly interested in researching the topic of Jaguar, the automobile. However, for this particular user in question, the user-specific query-dependent distribution $Pr(T_u|q,\theta_u)$ indicates that, when this person enters the query "jaguar," he or she is most likely interested in a nature-related topic. The query-independent distributions may also shed light on the manner in which the search results can be appropriately personalized for this user. For example, the query-independent distribution $Pr(T_u|\theta_u)$ indicates that the user is generally interested in the topic of conservation, which may have some bearing on the decision to weight an animal-related topic over a luxury car-related topic.

The query processing environment 200 can rely on any ontology to define the topics for which distributions are formed. In one case, for example, the query processing environment 200 can assign weights to topics defined by the Open Directory Project (ODP). Alternatively, or in addition, the query processing environment 200 can specify its own (custom) ontology of topics, or the query processing environment 200 can learn the topics in an unsupervised fashion from a large corpus of data.

In the examples set forth above, the ranking module 212 outputs personalized results for the user in the form of a collection of ranked search result items. But, as stated above, the ranking module 212 can also use the query, in conjunction with one or more of the above-described probability distributions, to provide other forms of personalized results for the user. For example, the ranking module 212 can use the query and probability distributions to identify the topic that the user is presumed to be looking for in the context of the submission of the query. A query reformulation module 218 can then act on that conclusion by: (1) suggesting a reformulation of the query for the user's consideration; (2) and/or automatically reformulating the query for the user and submitting it to the search engine functionality; (3) and/or asking the user to clarify his or her search intent, etc.

For example, assume that a user expresses the input query "Ryan White." For most users, the ranking module 212 will assume that the query is correctly spelled and that the user, in fact, intends to search for the name "Ryan White." In another scenario, the user's profile may indicate that he or she frequently performs searches related to the field of information retrieval. Based on this user profile, the ranking module 212 may realize that there is a good chance that the user actually intends to search for the person "Ryen White," a researcher who is active in the field of information retrieval. The ranking module 212, in cooperation with the query reformulation module 218, can therefore offer the user an alternative query suggestion in the form of "Ryen White," and/or automatically submit a reformulated query "Ryen White" to the search engine functionality, and/or ask the user if he or she actually intended to type "Ryen White," etc. As an outcome, the user will receive the customized result in which "Ryen" replaces "Ryan," even though the name "Ryan" is far more common than "Ryen," when considered in general.

Nevertheless, to facilitate explanation, most of the following examples will assume that the ranking module 212 generates personalized results in the form of a ranked list of search result items.

B. Illustrative Processes

FIGS. 7-10 show procedures which explain the operation of the illustrative query processing environment 200 of FIG. 2. Since the principles underlying the operation of the query processing environment 200 have already been described in Section A, certain operations will be addressed in summary fashion in this section.

Figure 7:
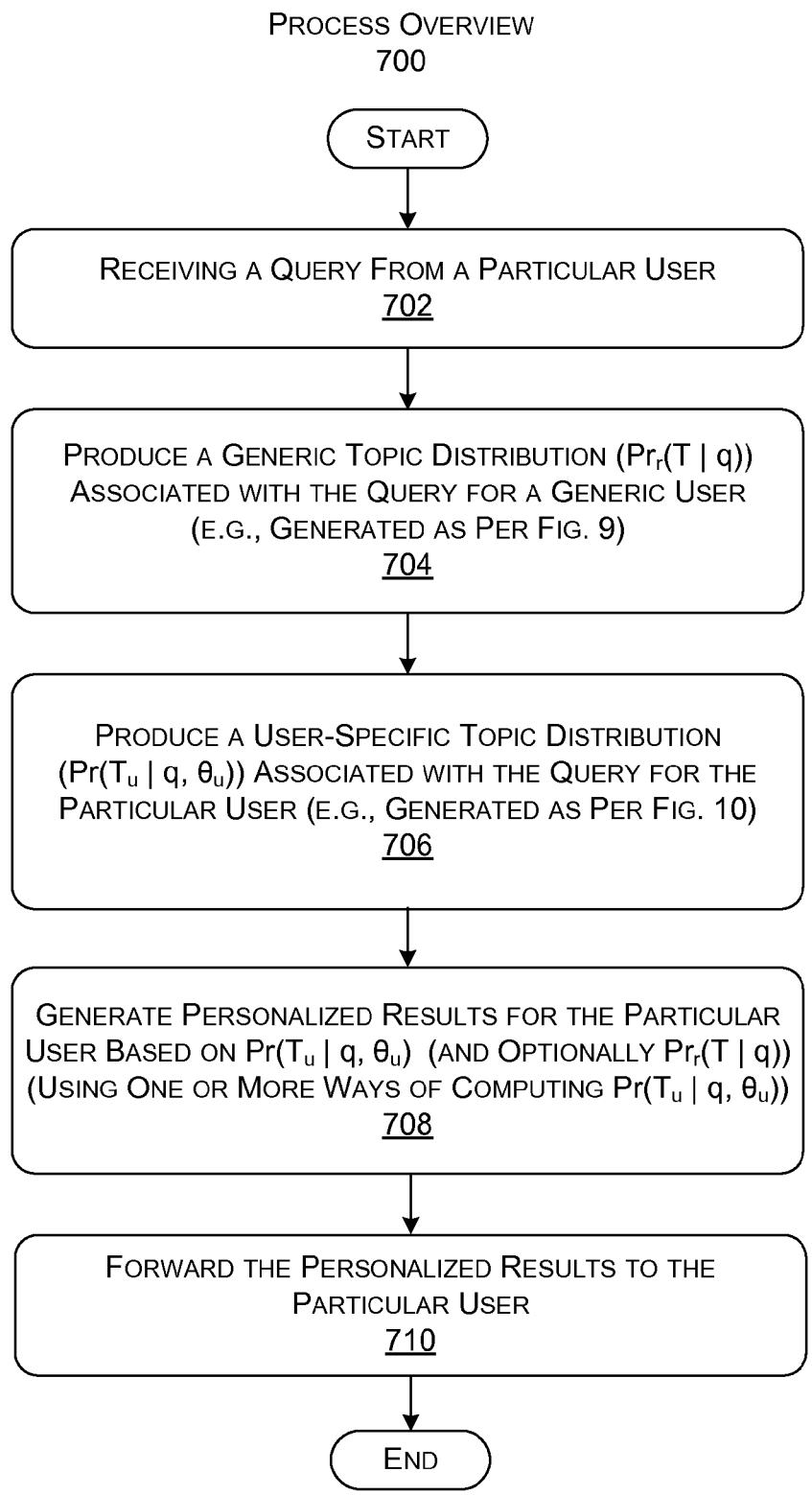
FIG. 7 shows a procedure that represents an overview of one manner of operation of the query processing system of FIG. 2.

Beginning with FIG. 7, this figure shows a procedure 700 that represents an overview of one manner of operation of the query processing system 202 of FIG. 2. In block 702, the query processing system 202 receives a query q from a particular user u who is assumed to be searching for a document which satisfies the query with respect to the topic $T_u$, where the user is characterized by user information $\theta_u$. In block 704, the query processing system 202 optionally produces a query-dependent generic topic distribution $Pr_r(T|q)$ associated with the query that is germane to a population of generic users. In block 706, the query processing system 202 produces a user-specific query-dependent topic distribution $Pr(T_u|q,\theta_u)$ associated with the query for the particular user. In block 708, the query processing system 202 produces personalized results for the particular user based on the generic topic distribution $Pr_r(T|q)$ and the user-specific query-dependent topic distribution $Pr(T_u|q,\theta_u)$ (or, in the case of Equation (1), just $Pr(T_u|q,\theta_u)$). The query processing system 202 can perform this task in a single stage or in two or more stages (e.g., by first generating an original ranking using any search engine functionality, and then using $Pr_r(T|q)$ and $Pr(T_u|q,\theta_u)$ to modify that original ranking, e.g., as per Equation (2)). Alternatively, or in addition, the personalization performed in block 708 can comprise a query reformulation, or other personalized results. Finally, in block 710, the query processing system 202 sends the personalized results to the user.

Figure 8:
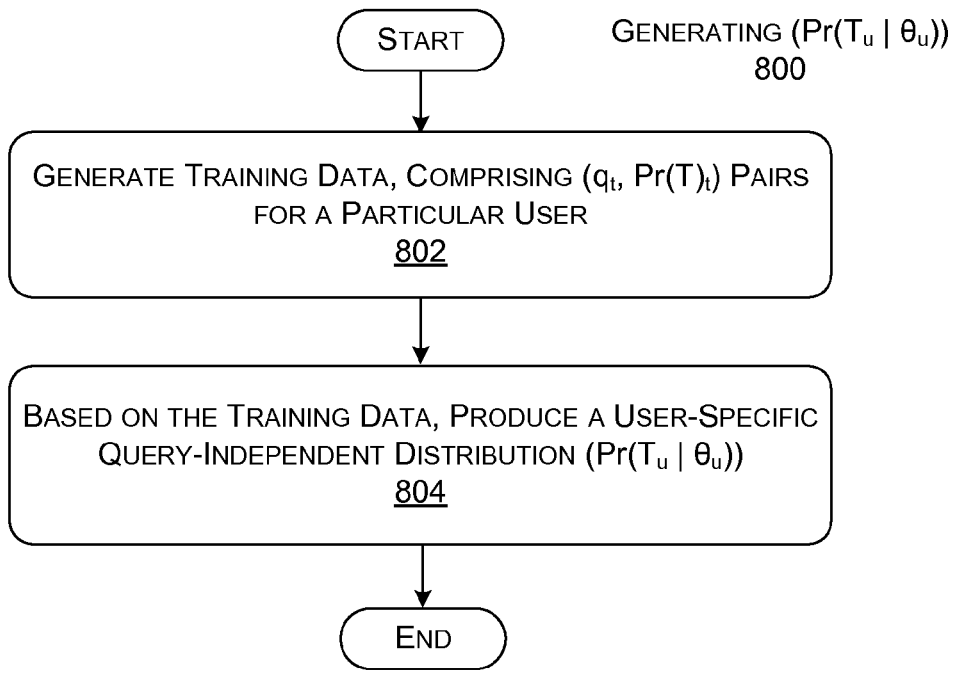
FIG. 8 shows a procedure for generating $Pr(T_u|\theta_u)$ based on training data.

FIG. 8 shows a procedure 800 by which the generation system 214 produces $Pr(T_u|\theta_u)$ based on training data for a particular user u. In block 802, the generation system 214 produces training data based on the user data stored in the data store 216. In one case, the user data, for the particular user, comprises queries submitted by this user, search results provided to the user in response to the queries, and indications of actions taken (or not taken) by the user in response to the search results. The user data can also include general browsing activity, desktop activity, explicit user preferences, etc.

The generation system 214 can apply different strategies to correlate the actions taken by a user with judgments that are implicitly being expressed by the user. For instance, in one approximation, the generation system 214 assumes that, upon selecting a document, the user's desired target topic $(T_u)$ matches the topic of the document that has been selected. More specifically, assume that the user submits a query q and receives, in response, search results that identify a ranked list of documents. Further suppose that the user clicks on c documents in the search results, e.g., $d_1, d_2, \ldots, d_c$. Altogether, this activity defines one instance t of the user's search session. The distribution of topics $\widehat{Pr}(T)_t$ for this instance t can be calculated by determining the strengths of topics T expressed in the documents that have been clicked on, summing up those contributions over all of the documents clicked on (on a per-topic basis), and dividing by c (the number of documents that have been clicked on). That is, $$\widehat{Pr}(T)_t = \frac{1}{c}\sum_{i=1}^{c} Pr(T|d_i). \qquad (3)$$

In this expression, $Pr(T|d_i)$ describes an individual document's user-independent and query-independent topic distribution. In other words, $Pr(T|d_i)$ reflects the topics associated with the document, given the characteristics of the document itself (such as the textual characteristics of the document).

The generation system 214 can produce Pr(T|$d_i$) for each document in an offline manner using any type of classifier, such as a text-based classifier.

For example, suppose the user clicked on five items in the search results, after submitting a particular query. To determine the weight of a "sports" topic in the distribution $\widehat{Pr}(T)_t$, the generation system 214 can add up the weights associated with the "sports" topic over the five result items that have been clicked on, followed by dividing by 5.

The generation system 214 can generate an instance of training data, for a particular user, as a particular pair of $q_t$ and $\widehat{Pr}(T)_t$. That is, $q_t$ is a query submitted by the user that causes the search engine functionality to provide particular search results; $\widehat{Pr}(T)_t$ describes a distribution of topics associated with documents clicked on by a user within the search results.

In block 804, the generation system 214 can now produce Pr($T_u|\theta_u$) based on N training points which have been produced in the above-described manner for a particular user u. For example:

$$Pr(T_u | \theta_u) = \frac{1}{N} \sum_{t=1}^{N} \widehat{Pr}(T)_t. \quad (4)$$

In other words, the generation system 214 sums the per-topic contributions of $\widehat{Pr}(T)_t$ over N training points, and then divides by N, essentially forming an average representation of the $\widehat{Pr}(T)_t$ distributions. Since Pr($T_u|\theta_u$) is computed without reference to queries, the resultant Pr($T_u|\theta_u$) distribution reflects a user-specific, but query-independent, distribution of the user's interests.

In other cases, the query processing system 202 can form user-specific query-independent distributions for respective groups of users. Such a distribution applies to an individual user insofar as that user is a member of a particular group. The query processing system 202 can form such a distribution by clustering users into a group based on or more shared characteristics of the users, and then computing a topic distribution for the group in the manner specified above. Or the query processing system 202 can form the topic distribution for the group based on the individual Pr($T_u|\theta_u$) distributions for the group members.

Figure 9:
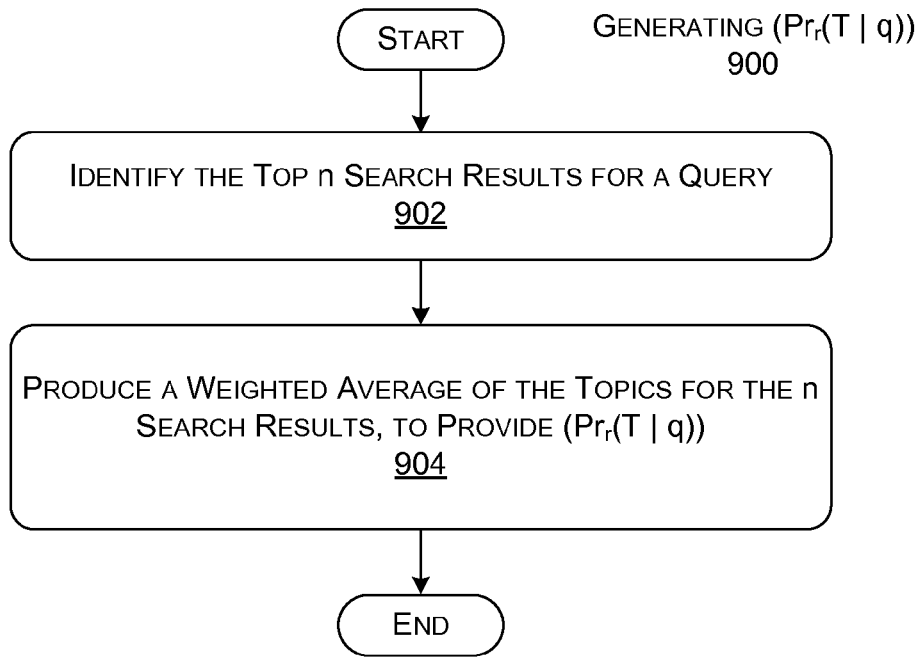
FIG. 9 shows a procedure for generating $Pr_r(T|q)$.

FIG. 9 shows one possible procedure 900 for generating the generic topic distribution Pr$_r$(T|q). In block 902, the query processing system 202 generates the top n results for a particular query q using any search engine functionality, without taking into consideration the user who may have submitted this query. More specifically, in one case, the search engine functionality provides general-purpose search results that are not tailored to any particular individual users, ultimately reflecting the prevalent interests expressed in the corpus of training data that is used to produce the ranking model of the search engine functionality. Hence, the query processing system 202 can use these results as an approximate representation of the distribution of topics with respect to a generic population of users. In block 904, the query processing system 202 produces a weighted average of the topic distributions in the top n search results for the particular query q, yielding the distribution Pr$_r$(T|q).

More specifically, consider the simplified case in which the query is "jaguar," which yields 20 top-ranked search result items. The query processing system 202 can assess the weight of the topic "nature" for this query by determining the strength of this topic in each of the twenty search result items (e.g., using the per document Pr($T_d$|d) distributions). The query processing system 202 then weights each of these contributions in an appropriate manner, for example, by weighting the highest-ranking item more than other items in the search results. (Other ways of weighting are possible, such as by considering the amount of time that the user dwells on a particular result item, etc.) The query processing system 202 then sums the weighted contributions to provide an aggregate weight for the topic "nature," for the particular query "jaguar," and divides by the total number of contributions. The query processing system 202 performs this over all topics in the top search results to yield the distribution Pr$_r$(T|q).

The query processing system 202 can alternatively, or in addition, use other techniques to produce the background distribution Pr$_r$(T|q). For example, the query processing system 202 can identify the set of items (e.g., URLs) in the search results (and/or independent of the search results) that have been selected (e.g., clicked on) by users in response to the submission of a particular query. The query processing system 202 can then produce Pr$_r$(T|q) based on the distribution of topic strengths associated with the set of result items that have been selected.

In another case, assume that a distribution of topics for generic users Pr$_r$(T) and a language model Pr(q|T) are provided. The query processing system 202 can apply Bayes' rule to obtain Pr$_r$(T|q), in effect by multiplying these two distributions and renormalizing.

Figure 10:
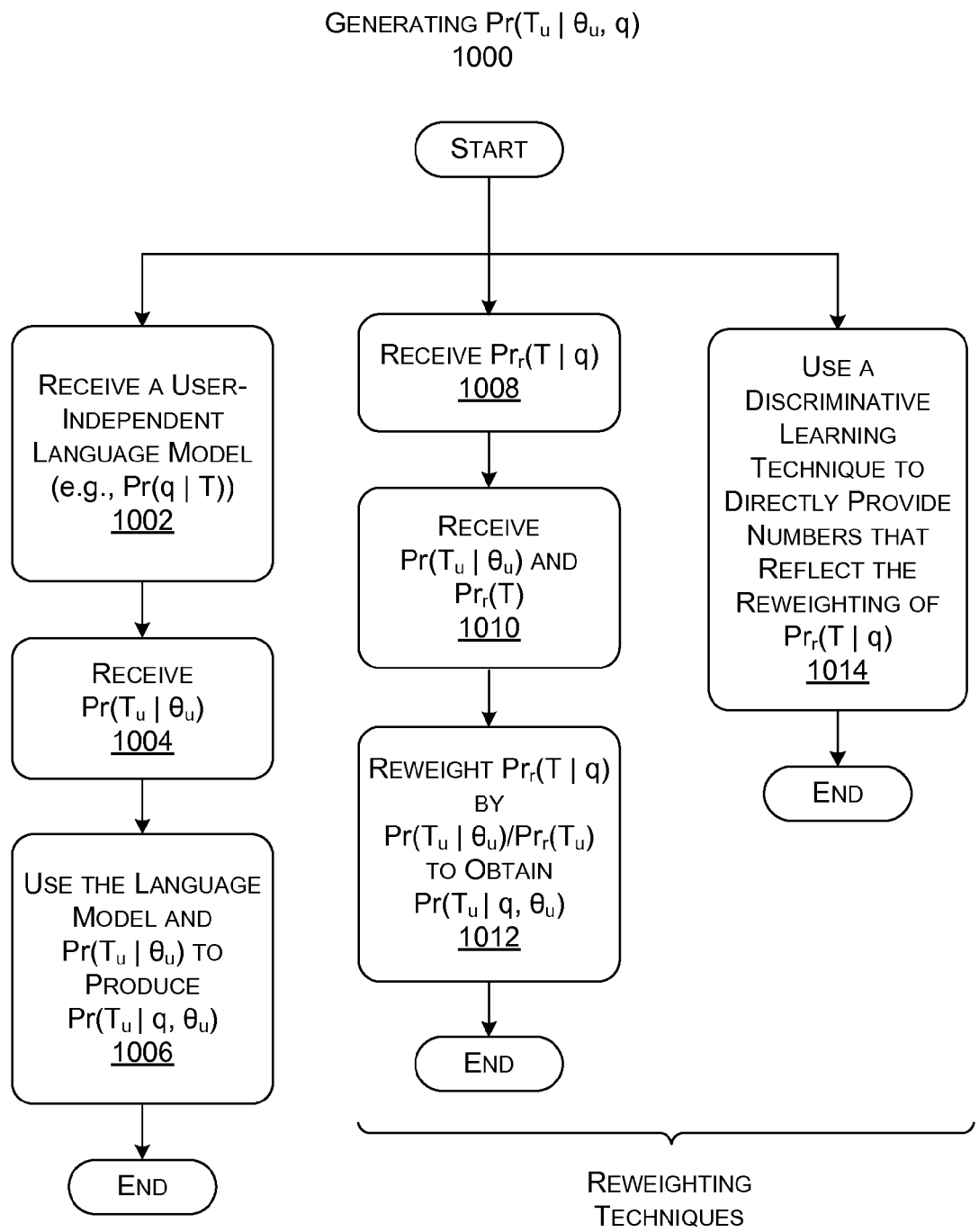
FIG. 10 shows a procedure for generating $Pr(T_u|q,\theta_u)$ according to three illustrative techniques; the third such technique directly produces $Pr(T_u|q,\theta_u)$ using a discriminative learning approach.

FIG. 10 shows a procedure for generating Pr($T_u|q,\theta_u$) according to three illustrative techniques. Blocks 1002, 1004, and 1006 represent a first technique that computes Pr($T_u|q,\theta_u$) based on a language model and Pr($T_u|\theta_u$). That is, in block 1002, the query processing system 202 receives a language model that can be produced in an offline manner by the generation system 214. The language model is denoted by Pr(q|T). For example, the generation system 214 may produce and provide a unigram language model given by Pr(q|T) =$\pi_{w \in q}$ Pr(w|T) for each T, where w denotes a word in the query q. In block 1004, the query processing system 202 receives the user-specific query-independent distribution Pr($T_u|\theta_u$), computed in the manner described above for FIG. 8.

In block 1006, the query processing system 202 uses the language model Pr(q|T) and the user-specific query-independent distribution Pr($T_u|\theta_u$) to produce Pr($T_u|q,\theta_u$). For example, in one implementation, the query processing system 202 can apply Bayes' theorem to obtain:

$$Pr(T_u | q, \theta_u) = \frac{Pr(T_u | \theta_u) Pr(q | T)}{\sum_{T'} Pr(T' | \theta_u) Pr(q | T')}. \quad (5)$$

In this expression, T' is a topic over which aggregation is performed. This type of model can be classified as a generative model because it indirectly attempts to produce Pr($T_u|q,\theta_u$) based on the prior distribution Pr($T_u|\theta_u$) and the observation distribution Pr(q|T).

Blocks 1008, 1010, and 1012 correspond to a second technique for generating Pr($T_u|q,\theta_u$). And block 1014 corresponds to a third technique for generating Pr($T_u|q,\theta_u$). Both the second and the third techniques operate by reweighting the generic topic distribution Pr$_r$(T|q) by user-specific multipliers.

Starting with the second technique, in block 1008, the query processing system 202 receives the query-dependent generic topic distribution Pr$_r$(T|q) and a query-independent generic topic distribution $Pr_r(T)$. In block 1010, the query processing system 202 receives the user-specific query-independent distribution $Pr(T_u|\theta_u)$. In block 1012, the query processing system 202 produces $Pr(T_u|q,\theta_u)$ based on $Pr_r(T|q)$, $Pr_r(T)$, and $Pr(T_u|\theta_u)$. For example, in one approach, the query processing system 202 produces $Pr(T_u|q,\theta_u)$ using the following expression, again applying Bayes' rule:

$$Pr(T_u|q,\theta_u) \propto Pr_r(T_u|q) \frac{Pr(T_u|\theta_u)}{Pr_r(T)}. \qquad (6)$$

The distribution $Pr_r(T)$ can be computed in an offline manner, e.g., in the manner specified in Equation (3), but using search data from all users rather than a particular user. The second technique, like the first, produces $Pr(T_u|q,\theta_u)$ using a generative model.

Finally, in the third technique (in block 1014), the query processing system 202 uses a discriminative learning technique to directly learn $Pr(T_u|q,\theta_u)$ based on the training data, e.g., rather than using Bayes' rule to produce $Pr(T_u|q,\theta_u)$ in an indirect generative manner based on prior probability distributions. In one implementation, the query processing system 202 can perform at least parts of this discriminative training in an offline manner. For example, the query processing system 202 can perform the discriminative training on a periodic basis. In each updating operation, the query processing system 202 can update the profiles of the users based on all of the training data that has been collected for the users since the last updating operation. Alternatively, or in addition, the query processing system 202 can perform the discriminative training in a more dynamic manner, e.g., by updating the profile of a user after collecting each new instance of training data for that user. The dynamic mode of operation may reduce or eliminate the need for archiving user data.

Figure 11:
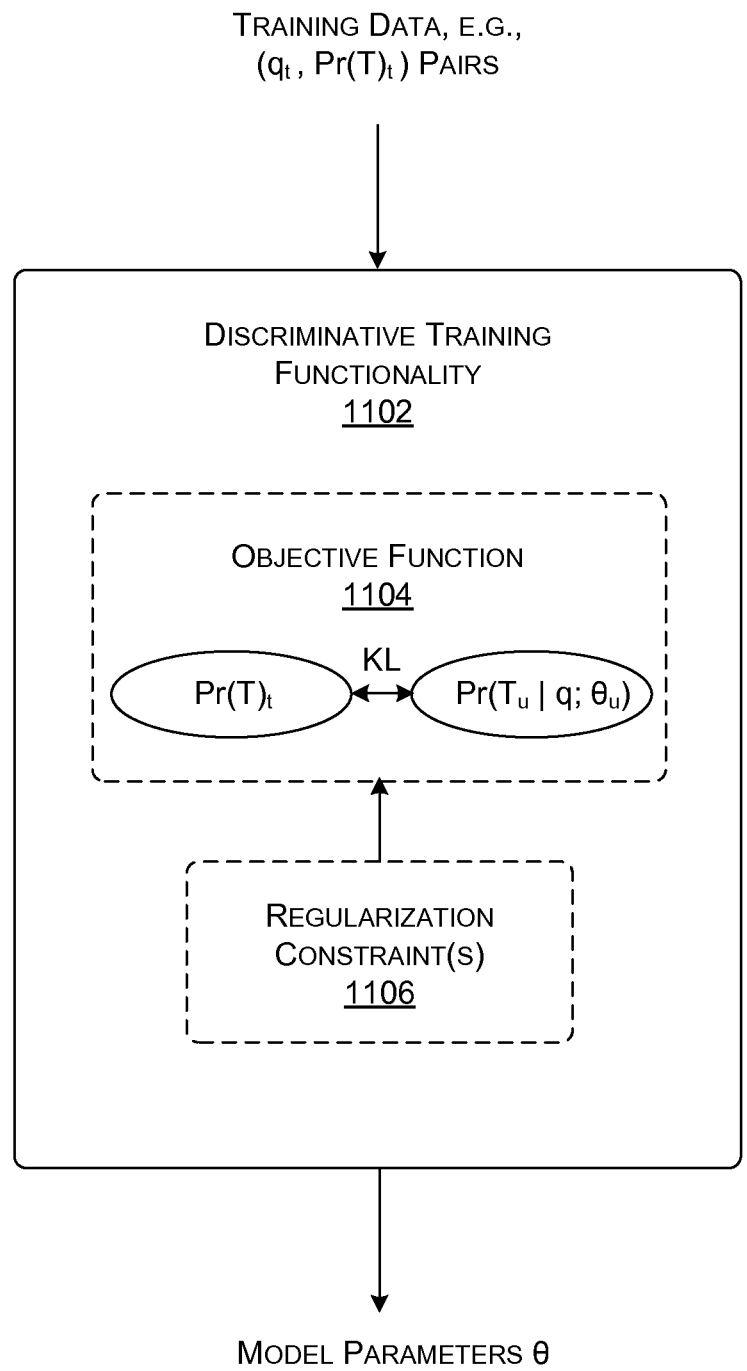
FIG. 11 shows discriminative training functionality that can be used to produce $Pr(T_u|q,\theta_u)$ according to one of the techniques shown in FIG. 10.

FIG. 11 shows discriminative training functionality 1102 that can produce $Pr(T_u|q,\theta_u)$ based on the type of training data described above (e.g., comprising pairs of $q_t$ and $\widehat{Pr}(T)_t$ for users). In one implementation, it is assumed that the conditional distribution lies in the exponential family, with the following parametric form:

$$Pr(T|q;\theta) = \exp(\Phi(T,q)\cdot\theta - A(\theta)) \qquad (7),$$

where $A(\theta)$ denotes the log of the normalization term, also known as the partition function. The training functionality 1102 can apply the following feature vector 8:

$$\phi(T,q) = <\log Pr_r(T|q), 0, 0, \ldots, 0, 1, 0, \ldots, 0> \qquad (8),$$

where 1 appears in the T+1'th location. In this formulation, the training functionality 1102 learns parameters that correspond to a user-specific reweighting of $Pr_r(T|q)$. Moreover, the training functionality 1102 learns a different such parameter vector $\theta$ for each user. Each parameter vector has a number of components, e.g., $\theta_0$, $\theta_1$, etc.

More specifically, the training functionality 1102 solves for the parameter vectors by formulating an objective function 1104, subject to regularization constraints 1106. The training functionality 1102 then can use any optimization technique to solve the objective function 1104, e.g., by minimizing the objective function 1104.

In one implementation, the objective function 1104 can be expressed using the Kullback-Leibler (KL) divergence as:

$$\sum_{t=1}^{N} KL\big(\widehat{Pr}(T)_t, Pr(T|q;\theta)\big) + C_1(\theta_0 - 1)^2 + C_2\|\theta_{1:end}\|^2. \qquad (9)$$

Ignoring constant terms, $KL(\widehat{Pr}(T)_t, Pr(T|q;\theta))$ is equal to:

$$-\sum_T \widehat{Pr}(T)_t \log Pr(T|q;\theta) = \qquad (10)$$

$$\log \sum_T \exp(\phi(T,q)\cdot\theta) - \sum_T \widehat{Pr}(T)_t \phi(T,q)\cdot\theta.$$

The first term in the objective function 1104 in Equation (9) expresses the KL divergence between $\widehat{Pr}(T)_t$ (which is derived from the training data) and a representation of the target model, $Pr(T_u|q,\theta_u)$, being formed. In one implementation, the training functionality 1102 solves the objective function subject to $\theta_0 \geq 0$, where $\theta_0$ refers to the first component of $\theta$. Further, the training functionality 1102 can apply a regularization constraint associated with the generative model set forth in Equation (6). That is, if there is little training data for a particular user, the training functionality 1102 can bias the solution toward $\theta_0=1$ and $\theta_T=\log(Pr(T|\theta_u)/Pr_r(T))$, which is what is expressed in Equation (6). The regularization then expresses that, a priori, $Pr(T|\theta_u) \approx Pr_r(T)$.

In closing, FIG. 7 was used to describe the generation of various personalization-based features in the context of the dynamic query-time processing performed by the query processing system 202. The generation system 214 can also produce the above-described personalization-based features in the context of the generation of a training dataset, where that training dataset is then used to produce the ranking model used by the ranking module 212. More specifically, the procedure for generating the ranking model can entail: (1) collecting data which characterizes the online activity of users; (2) formulating features which characterize the online activity; (3) supplying judgment labels associated with the online activity; and (4) creating (or updating) the ranking model using any training methodology, based on the training dataset produced in operations (2) and (3).

The personalization-based features can include, among other features, features derived from any of: $Pr(T_u|q,\theta_u)$, $Pr(T_u|\theta_u)$, $Pr_r(T|q)$, $Pr_r(T)$, etc. In addition, or alternatively, the ranking model can incorporate additional features which leverage the probabilistic nature of its analysis. For example, the ranking model can take into consideration the levels of uncertainty associated with any distribution(s) described above. The uncertainty associated with a distribution can be assessed in different ways, such as by an entropy measure, a variance measure, etc.

In addition, as explained above, the query processing system 202 can determine an amount of personalization to perform based on a level of uncertainty associated with one or more of the topic distributions described above. For example, the query processing system 202 can reduce the personalization that is performed for a particular user if one or more of $Pr(T_u|\theta_u,q)$ and $Pr(T_u|q)$ have high levels of uncertainty associated therewith.

The query processing system 202 can be extended in additional ways. For example, in the above description, the query processing system 202 bases its analysis on a single user-specific latent variable $V_u$ (having multiple discrete states) and a single item-specific latent variable $V_d$ (having multiple discrete states). But in other cases, the query processing system 202 can perform its analysis with respect to two or more user-specific latent variables and two or more item-specific latent variables. Possible latent variables include topic, reading level, geographic location, etc. In this context, the notation $V_u$ can be more broadly interpreted as describing a state space that includes two or more dimensions (e.g., topic, reading level, geographic location, etc.), where each dimension has multiple states. A user's search intent can be expressed with respect to any single dimension of $V_u$ or with respect to two or more dimensions of $V_u$.

In addition, or alternatively, the query processing system 202 can operate in a multi-labeling scenario in which $V_d$ is treated as an indicator vector which expresses two or more properties (states) of an item (not simply a single property of an item). For example, the query processing system 202 can treat $T_d$ as an indicator vector which identifies two or more topics associated with a document. The query processing system 202 can determine that such a document is appropriate to present to the user if: (a) the document satisfies the user's query; and (b) the document has at least one topic that maps to the user's search needs (as defined by $T_u$). The query processing system 202 can achieve this result by defining $cover_u(d,q)$ in a manner such that vector $T_d$ is considered to cover an information need $T_u$ if any of the document's topics is deemed relevant to the information need, as defined by some mapping function.

C. Representative Computing Functionality

FIG. 12 sets forth illustrative computing functionality 1200 that can be used to implement any aspect of the functions described above. For example, the computing functionality 1200 can be used to implement any aspect(s) of the query processing environment 200 of FIG. 2, e.g., as implemented in the embodiment of FIG. 3, or in some other embodiment. In one case, the computing functionality 1200 may correspond to any type of computing device that includes one or more processing devices. In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various media devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible entity.

The computing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, the functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a query q from a particular user u who intends to find results that satisfy the query q with respect to a topic $T_u$, the particular user u being characterized by user information $\theta_u$;
producing a generic topic distribution $Pr_r(T|q)$ associated with the query q that is germane to a population of generic users;
producing a user-specific query-dependent topic distribution $Pr(T_u|q,\theta_u)$ associated with the query q for the particular user u; generating personalized results for the particular user u based on the generic topic distribution $Pr_r(T|q)$ and the user-specific query-dependent topic distribution $Pr(T_u|q,\theta_u)$; and
forwarding the personalized results to the particular user u.

2. The method of claim 1, wherein said producing of the generic topic distribution $Pr_r(T|q)$ comprises at least one of:
producing $Pr_r(T|q)$ based on analysis of result items for the query q, as generated by search engine functionality; or
producing $Pr_r(T|q)$ using Bayes' rule, based on a user-independent query-independent distribution over topics $Pr_r(T)$ for the population of generic users and a user-independent language model $Pr(q|T)$.

3. The method of claim 1, wherein said producing of the user-specific query-dependent topic distribution $Pr(T_u|q,\theta_u)$ comprises:

receiving a user-independent language model;
receiving a user-specific query-independent distribution $Pr(T_u|\theta_u)$ describing a probability that the particular user u is intent on finding identified topics; and
computing the user-specific query-dependent topic distribution $Pr(T_u|q,\theta_u)$ based on the user-independent language model and the user-specific query-independent distribution $Pr(T_u|\theta_u)$, using Bayes' rule.

4. The method of claim 3, wherein the user-specific query-dependent topic distribution $Pr(T_u|q,\theta_u)$ is produced as:

$$Pr(T_u | q, \theta_u) = \frac{Pr(T_u | \theta_u) Pr(q | T)}{\sum_{T'} Pr(T' | \theta_u) Pr(q | T')},$$

wherein $Pr(q|T)$ corresponds to the user-independent language model, $Pr(T_u|\theta_u)$ corresponds to the user-specific query-independent distribution, and T' is a topic over which aggregation is performed.

5. The method of claim 1, wherein said producing of the user-specific query-dependent topic distribution $Pr(T_u|q,\theta_u)$ comprises reweighting the generic topic distribution $Pr_r(T|q)$ by user-specific multipliers.

6. The method of claim 5, further comprising producing the user-specific multipliers by:
receiving a user-specific query-independent distribution $Pr(T_u|\theta_u)$, describing a prior probability that the particular user u is intent on finding identified topics;
receiving a user-independent query-independent distribution over topics $Pr_r(T)$ for the population of generic users; and
forming a ratio of the user-specific query-independent distribution $Pr(T_u|\theta_u)$ and the user-independent query-independent distribution over topics $Pr_r(T)$, to produce the user-specific multipliers.

7. The method of claim 5, further comprising learning the user-specific multipliers using a discriminative learning technique.

8. The method of claim 1, further comprising, in a training process, learning a user-specific query-independent distribution $Pr(T_u|\theta_u)$, the training process comprising:
generating training data associated with the particular user u, the training data identifying queries $q_t$ submitted by the particular user u and N distributions of topics $\widehat{Pr}(T)_t$ associated with search results, the search results being provided by search engine functionality in response to the queries $q_t$; and
computing the user-specific query-independent distribution $Pr(T_u|\theta_u)$ by computing an average over the N distributions of topics $\widehat{Pr}(T)_t$.

9. The method of claim 1, wherein said generating of the personalized results is based on application of a ranking function, expressed as rel score=obs(d,q)*reweighting factor,
wherein obs(d,q) is a score generated by search engine functionality for a particular document d, with respect to the query q submitted by the particular user u,
reweighting factor is a factor, based on at least the generic topic distribution $Pr_r(T|q)$ and the user-specific query-dependent topic distribution $Pr(T_u|q,\theta_u)$, which modifies obs(d,q), and
rel score is a modified score produced by multiplying obs(d,q) by the reweighting factor.

10. The method of claim 9, wherein the reweighting factor is provided by:

$$\sum_{T_d} Pr(T_d | d) \frac{\sum_{T_u} Pr(T_u | q, \theta_u) f(T_u, T_d)}{\sum_T Pr_r(T | q) f(T, T_d)}$$

wherein $T_d$ is a topic associated with the document d,
T is a topic over which aggregation is performed,
$Pr(T_d|d)$ is a distribution of topics for the document d, and
$f(T,T_d)$ is $Pr(cover(d,q)=1|T,T_d)$, which provides an indication of whether the topic $(T_d)$ associated with the document d addresses the topic T.

11. The method of claim 1, wherein said generating of the personalized results comprises generating one or more features based on at least one of $Pr_r(T|q)$ and $Pr(T_u|q,\theta_u)$, and providing said one or more features to a ranking module for use by the ranking module in performing a feature-based ranking operation.

12. The method of claim 1, wherein the user-specific query-dependent topic distribution $Pr(T_u|q,\theta_u)$ pertains to a group of users, the particular user u being a member of the group of users.

13. The method of claim 1, wherein said generating of the personalized results comprises:
assessing a level of uncertainty associated with at least one of the generic topic distribution $Pr_r(T|q)$ and the user-specific query-dependent topic distribution $Pr(T_u|q,\theta_u)$, to provide an assessed level of uncertainty; and
using the assessed level of uncertainty to determine an extent to which personalization is performed.

14. A query processing system comprising:
one or more modules; and
one or more processing devices configured to execute the one or more modules, the one or more modules comprising:
an interface module configured to receive a query q from a particular user u, the particular user u attempting to find an item d that satisfies the query q and has a desired characteristic $V_u$, and the particular user u being characterized by user information $\theta_u$;
a feature determination module configured to generate features which characterize a context in which the particular user u is attempting to find the item d;
a particular user predictor module configured to generate a user-specific query-dependent distribution $Pr(V_u|q,\theta_u)$ associated with the query q for the particular user u; and
a ranking module configured to generate personalized results for the particular user u based on at least the features and the user-specific query-dependent distribution $Pr(V_u|q,\theta_u)$,
wherein the interface module is configured to forward the personalized results to the particular user u.

15. The query processing system of claim 14, wherein the desired characteristic $V_u$ corresponds to a topic $T_u$ that the particular user u is presumed to be intent on finding with respect to the query q.

16. The query processing system of claim 14, wherein the particular user predictor module comprises:
logic configured to receive a user-independent language model;
logic configured to receive a user-specific query-independent distribution $Pr(V_u|\theta_u)$; and
logic configured to compute the user-specific query-dependent distribution $Pr(V_u|q,\theta_u)$ based on the user-independent language model and the user-specific query-independent distribution $Pr(V_u|\theta_u)$, using Bayes' rule.

17. The query processing system of claim 14, the one or more modules further comprising:

a generic predictor module configured to generate a generic distribution $Pr_r(V|q)$ associated with the query q that is germane to a population of generic users, wherein the particular user predictor module is configured to reweight the generic distribution $Pr_r(V|q)$ by user-specific multipliers to provide the user-specific query-dependent distribution $Pr(V_u|q,\theta_u)$.

18. A computer readable memory device or media device storing computer readable instructions which, when executed by one or more processing devices, cause the one or more processing devices to perform acts comprising:

receiving a query from a particular user who intends to find results that satisfy the query with respect to an individual topic, the particular user being characterized by user information;

generating a generic topic distribution associated with the query that is germane to a population of generic users;

generating a user-specific query-dependent topic distribution associated with the query for the particular user by reweighting the generic topic distribution by user-specific multipliers; and generating personalized results for the particular user based on the generic topic distribution and the user-specific query-dependent topic distribution.

19. The computer readable memory device or media device of claim 18, the acts further comprising generating the user-specific multipliers by a forming ratio of:

a user-specific query-independent distribution describing a prior probability that the particular user is intent on finding identified topics, and a user-independent query-independent distribution over multiple topics for the population of generic users.

20. The computer readable memory device or media device of claim 18, the acts further comprising learning the user-specific multipliers using a discriminative learning technique.

* * * * *